US009969816B2

(12) United States Patent
Nuopponen et al.

(10) Patent No.: US 9,969,816 B2
(45) Date of Patent: May 15, 2018

(54) METHOD FOR CATALYTIC OXIDATION OF CELLULOSE AND METHOD FOR MAKING A CELLULOSE PRODUCT

(71) Applicant: UPM-KYMMENE CORPORATION, Helsinki (FI)

(72) Inventors: Markus Nuopponen, Helsinki (FI); Timo Paakkonen, Helsinki (FI); Raili Ponni, Vantaa (FI); Tapani Vuorinen, Espoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 159 days.

(21) Appl. No.: 14/913,513

(22) PCT Filed: Sep. 2, 2014

(86) PCT No.: PCT/FI2014/050669
§ 371 (c)(1),
(2) Date: Feb. 22, 2016

(87) PCT Pub. No.: WO2015/028719
PCT Pub. Date: Mar. 5, 2015

(65) Prior Publication Data
US 2016/0201261 A1 Jul. 14, 2016

(30) Foreign Application Priority Data
Sep. 2, 2013 (FI) ...................... 20135886

(51) Int. Cl.
*C08B 1/08* (2006.01)
*C08B 15/04* (2006.01)
*D21C 9/02* (2006.01)
*C08B 15/02* (2006.01)
*D21C 9/00* (2006.01)
*D21H 11/18* (2006.01)

(52) U.S. Cl.
CPC ............... *C08B 15/04* (2013.01); *C08B 1/08* (2013.01); *C08B 15/02* (2013.01); *D21C 9/004* (2013.01); *D21C 9/005* (2013.01); *D21C 9/02* (2013.01); *D21H 11/18* (2013.01)

(58) Field of Classification Search
CPC .......... C08B 1/08; C08B 15/02; C08B 15/04; D21C 9/02; D21C 9/005; D21C 9/004; D21H 11/18
USPC .......................................................... 162/9
See application file for complete search history.

(56) References Cited

U.S. PATENT DOCUMENTS

| 6,379,494 B1 | 4/2002 | Jewell et al. |
| 6,716,976 B1 | 4/2004 | Jetten et al. |
| 6,919,447 B2 | 7/2005 | Komen et al. |
| 9,410,285 B2 | 8/2016 | Vuorinen et al. |
| 2005/0121159 A1 | 6/2005 | Jetten et al. |
| 2012/0297555 A1 | 11/2012 | Chene et al. |
| 2014/0014283 A1 | 1/2014 | Lindstrom et al. |
| 2016/0160440 A1 | 6/2016 | Pääkkönen et al. |

FOREIGN PATENT DOCUMENTS

| AT | 501929 A1 | 12/2006 |
| CN | 1324784 A | 12/2001 |
| CN | 1341125 A | 3/2002 |
| CN | 101772517 A | 7/2010 |
| CN | 102652154 A | 8/2012 |
| CN | 102675475 A | 9/2012 |
| CN | 102776594 A | 11/2012 |
| CN | 102787444 A | 11/2012 |
| EP | 0226414 A2 | 12/1986 |
| EP | 1149846 A1 | 10/2001 |
| EP | 1245722 A2 | 10/2002 |
| EP | 1264845 A2 | 12/2002 |
| EP | 1505199 A1 | 2/2005 |
| EP | 2216345 A1 | 8/2010 |
| EP | 2226414 A1 | 9/2010 |
| EP | 2574633 A1 | 4/2013 |
| EP | 2784209 A1 | 10/2014 |
| JP | 0463901 A | 11/1971 |
| JP | 2001329001 A | 11/2001 |
| JP | 2003073402 A | 3/2003 |
| JP | 2003089701 A | 3/2003 |
| JP | 2003512540 A | 4/2003 |
| JP | 2009161613 A | 7/2009 |
| JP | 2009209218 A | 9/2009 |
| JP | 2011184475 A | 9/2011 |
| JP | 2011195660 A | 10/2011 |
| JP | 2011219551 A | 11/2011 |
| JP | 2012188472 A | 10/2012 |
| WO | 0050462 A | 8/2000 |
| WO | 0050462 A1 | 8/2000 |

(Continued)

OTHER PUBLICATIONS

Chinese Office Action for Chinese Patent Application No. 201480053544.2, dated Feb. 4, 2017; 8 Pages.
Chinese Office Action for Chinese Patent Application No. 201480053544.2, dated Feb. 4, 2017; English Translation; 10 Pages.
Anelli, et al. "Fast and Selective Oxidation of Primary Alcohols to Aldehydes or to Carboxylic Acids and of Secondary Alcohols to Ketones Mediated by Oxoammonium Salts under Two-Phase Conditions" J. Org. Chem. 1987, vol. 52, pp. 2559-2562.
International Search Report dated Nov. 18, 2014; International Application No. PCT/FI2014/050669; International Filing Date Sep. 2, 2014 (2 pages).
Isogai, A., et al., "Preparation of Polyuronic Acid from Cellulose by TEMPO-mediated Oxidation" Cellulose (1998) vol. 5, 153-164.

(Continued)

Primary Examiner — Mark Halpern
(74) Attorney, Agent, or Firm — Cantor Colburn LLP

(57) ABSTRACT

A method for catalytic oxidation of cellulose using a heterocyclic nitroxyl radical as catalyst and main oxidant acting as oxygen source comprises, before the catalytic oxidation of the cellulose, pretreatment of the cellulose—in an alkaline pretreatment step, where the cellulose is treated in alkaline solution having hydroxide concentration of above 0.3 M, and—in a washing step, where the cellulose treated in the alkaline solution is washed to lower the pH.

36 Claims, 1 Drawing Sheet

(56) References Cited

FOREIGN PATENT DOCUMENTS

| WO | 0123909 A1 | 4/2001 |
|---|---|---|
| WO | 0129309 A1 | 4/2001 |
| WO | 2005058972 A1 | 6/2005 |
| WO | 2009021688 A1 | 2/2009 |
| WO | 2009069641 A1 | 6/2009 |
| WO | 2009084566 A1 | 7/2009 |
| WO | 2009111915 A1 | 9/2009 |
| WO | 2011024807 A1 | 3/2011 |
| WO | 2012115590 A1 | 8/2012 |
| WO | 2012150701 A1 | 11/2012 |
| WO | 2012168562 A1 | 12/2012 |

OTHER PUBLICATIONS

Saito, et al., "Cellulose Nanofibers Prepared by TEMPO-Mediated Oxidation of Native Cellulose" Biomacromolecules 2007, vol. 8, 2485-2491.
Written Opinion dated Nov. 18, 2014; International Application No. PCT/FI2014/050669; International Filing Date Sep. 2, 2014 (8 pages).
Zhao et al., "Oxidation of Primary Alcohols to Carboxylic Acids with Sodium Chlorite Catalyzed by Tempo and Bleach: 4-Methoxyphenylacetic Acid (Benzeneacetic acid, 4-methoxy-)" Organice Syntheses, vol. 81, p. 195-203 (2005).
Hirota et al., "Oxidation of regenerated cellulose with NaClO2 catalyzed by TEMPO and NaClO under acid-neutral conditions" Carbohydrate Polymers 78 (2009) 330-335.
International Search Report dated Oct. 15, 2014; International Application No. PCT/FI2014/050600; International Filing Date Jul. 29, 2014 (3 pages).
Written Opinion dated Oct. 15, 2014; International Application No. PCT/FI2014/050600; International Filing Date Jul. 29, 2014; (7 pages).
"Biological technology of fibers", the 2nd ed. Chen Hongzhang, Chemical Industry Publisher, Feb. 28, 2011, pp. 19-21.
"Cellulose ether", Shao Ziqiang, Chemical Industry Publisher, Sep. 31, 2007, pp. 12-14.
Jiang, N. et al. "Cu(II) Selective Aerobic Oxidation of Alcohols under Mllg Conditions", J. Org. Chem. 2006, vol. 71, pp. 7087-7090.
Mannam, S. et al. "Aerobic, Chemoselective Oxidation of Alcohols to Carbonyl Compounds Catalysed by a DABCO-Copper Complex Under Mild Conditions", Adv. Synth. Catal. 2007, vol. 349, pp. 2253-2258.

METHOD FOR CATALYTIC OXIDATION OF CELLULOSE AND METHOD FOR MAKING A CELLULOSE PRODUCT

CROSS-REFERENCE TO RELATED APPLICATIONS

This application is a 371 of PCT/FI2014/050669 filed 2 Sep. 2014, which claims the benefit of Finish Application No. 20135886, filed Sep. 2, 2013, both of which are incorporated by reference herein in their entirety.

FIELD OF THE INVENTION

The invention relates to a method for catalytic oxidation of cellulose using a heterocyclic nitroxyl radical as catalyst.

BACKGROUND OF THE INVENTION

Cellulose is a renewable natural polymer that can be converted to many chemical derivatives. The derivatization takes place mostly by chemical reactions of the hydroxyl groups in the β-D-glucopyranose units of the polymer. By chemical derivatization the properties of the cellulose can be altered in comparison to the original chemical form while retaining the polymeric structure. Reaction selectivity is important so that a derivative of desired chemical structure could be obtained.

Heterocyclic nitroxyl compounds are known as catalysts that participate in the selective oxidation of C-6 hydroxyl groups of cellulose molecules to aldehydes and carboxylic adds, the corresponding oxoammonium salt being known as the active direct oxidant in the reaction series. One of these chemical oxidation catalysts known for a long time is "TEMPO", i.e. 2,2,6,6-tetramethylpiperidinyl-1-oxy free radical. Thus, the oxidized forms of the nitroxyl radicals, N-oxoammoniumions, act as direct oxidants in the oxidation of the target cellulose molecule, whereas a main oxidant is used to bring oxygen to the reaction series and convert the nitroxyl compound back to the oxidized form.

It is known to oxidize primary alcohols to aldehydes and carboxylic acids through "TEMPO" by using sodium hypochlorite as the main oxidant (for example Anelli, P. L.; Biffi, C.; Montanan, F.; Quici, S.; *J. Org. Chem.* 1987, 52, 2559). To improve the yield in the oxidation of the alcohols to carboxylic acids, a mixture of sodium hypochlorite and sodium chlorate was also used (Zhao, M. M.; Li, J.; Mano, E.; Song, Z. J.; Tschaen, D. M.; *Org. Synth.* 2005, 81, 195).

It is also known procedure to catalytically oxidize cellulose in native cellulose fibers through "TEMPO" by using sodium hypochlorite as main oxidant (oxygen source) and sodium bromide as activator (Saito, T. et al.; Cellulose Nanofibers Prepared by TEMPO-Mediated Oxidation of Native Cellulose, *Biomacromolecules* 2007, 8, 2485-2491). The primary hydroxyl groups (C6-hydroxyl groups) of the cellulosic β-D-glucopyranose units are selectively oxidized to carboxylic groups. Some aldehyde groups are also formed from the primary hydroxyl groups. When the fibers of oxidized cellulose so obtained are disintegrated in water, they give stable transparent dispersion of individualized cellulose fibrils of 3-5 nm in width, that is, so-called nanofibrillar cellulose.

Selectivity of the oxidation is important so that chemicals used are not consumed to unwanted side reactions. Selectivity can be defined as ratio of carboxylic groups formed to the main oxidant consumed.

The reaction rate of the catalytic oxidation is primarily dependent on the concentration of the heterocyclic nitroxyl catalyst, the concentration of the main oxidant, pH, reaction temperature, and the pulp consistency (concentration of the pulp in the reaction medium). The properties of the pulp are also significant, for example the availability of the unoxidized cellulose to reactants is an important factor. Amorphous cellulose is typically easier to oxidize than crystalline cellulose, as amorphous cellulose is more accessible to water.

Although it is possible to oxidize the cellulose to the desired oxidation level, as expressed for example by mmol COOH/g pulp, the problems may arise in the selectivity of the oxidation (COOH groups formed/consumed main oxidant such as NaClO). Low oxidation selectivity will cause increased consumption of the main oxidant. Low oxidation selectivity also correlates with low oxidation rate due to the decomposition of NaClO and the direct reaction between NaClO and pulp during the oxidation process, which tends to split the cellulose and lower the DP. Most selective oxidations of cellulose can be performed with reactive pulps. Never-dried pulps are good examples of reactive pulps. The higher reactivity of never-dried pulps compared with dry pulps is due to the cellulose microfibril aggregation that takes place as water is removed from the cellulosic material, which reduces the amount of accessible hydroxyl groups of cellulose in the pulp.

SUMMARY OF THE INVENTION

It is a purpose of the invention to provide a method for effectively and selectively oxidizing the C-6 hydroxyl groups of cellulose.

Another object is to provide a method for producing reactive cellulose, which will enable faster reaction rates. The object is especially to produce reactive cellulose, where the crystalline structure and polymer chain length (DP) is preserved so that the strength of the cellulose does not decrease.

It is a further object to provide a method for making nanofibrillar cellulose.

In the method, before the catalytic oxidation the cellulose is subjected to alkaline pretreatment in alkaline solution having hydroxide concentration of above 0.3 M, whereafter the cellulose is washed to lower the pH. The pH is still in the alkaline range after the washing. The pH is lowered to value of at the most or below 12, preferably 11, more preferably 10. When the pH is lowered to or below these values, the pH is lowered preferably to the range of 8-12, more preferably to the range of 9-11, and most preferably to the range of 9-10. Preferably the hydroxide concentration of the alkaline pretreatment solution is at least 0.5 M. Solutions of hydroxide concentration above 0.3 M, preferably at least 0.5 M can be used as alkaline pretreatment solutions. These correspond approximately to the pH values of at least 13.5 and at least 13.7, respectively. The hydroxide concentration of the alkaline pretreatment solution is in the range of 0.3-2.4 M, preferably 0.5-1.5 M, and most preferably 0.6-1.2 M. A solution of 1.0 M (pH 14) is supposed to be close to optimum, enabling an efficient treatment which is reversible with respect of pH of the pulp treated and does not alter the structure of cellulose. The solutions used in the above-mentioned concentrations are preferably alkali metal hydroxide solutions. NaOH and KOH solutions are suitable, because they are bases commonly used in chemical industry. If NaOH is used as the alkali metal hydroxide, the sodium can be recovered and used in the circulation of chemicals in a chemical pulp mill, if the process is used there.

The contact of the cellulose with the pretreatment solution need to be only a few minutes to increase the reactivity of the cellulose. There has been no significant difference in results, if the pretreatment time is raised from a few minutes to one hour. In the practice, the pretreatment time of only 5 to 15 min by an alkaline solution is sufficient.

The treatment is reversible, that is, the pH can be returned to neutral by washing the pretreated cellulose. The pH of the cellulose is measured from the suspension of washed cellulose which is at the pulp consistency of 5%.

The cellulose to be pretreated exists in fibrous raw material of plant origin, which can be commonly designated as pulp. The cellulose in the fibres has crystalline and amorphous regions, the crystalline cellulose being cellulose I. The raw material is most preferably chemical pulp. This pulp may still contain hemicelluloses, which will consume the oxidant. The alkaline pretreatment is mild enough so that the crystalline structure of cellulose is not altered and the DP (degree of polymerization), which characterizes the chain length of cellulose, is preferably retained, and if it decreases, it decreases at the most by 20% (is at least 80% of the original), and preferably at the most by 10% (90% of the original). However, by proper choice of the concentration of the alkaline solution, part of the hemicelluloses can also be removed in the treatment. An alkaline solution of 1M is already strong enough to remove part of hemicelluloses from the pulp, but does not yet affect the structure of the cellulose For example about 20-75% of the hemicelluloses present in the pulp, more specifically 25-50% can be removed with the alkaline solution.

The degree of polymerization (DP) is the average viscometric degree of polymerization representing the average number of glucose units in the cellulose polymer.

The spent alkaline solution used in the pretreatment can be circulated to a new pretreatment, after possible addition of makeup alkali to achieve the target hydroxide concentration. The hemicelluloses can be removed from the circulated solution so that they are not accumulated in the solution. Methods for removing hemicelluloses from alkaline solutions are known.

The pulp raw material subjected to the pretreatment can be never dried pulp or dried pulp. The method can be used to make dried pulp reactive for the catalytic oxidation.

After the cellulose has been pretreated, the cellulose is subjected to catalytic oxidation. Any method can be used for activating the catalyst and performing the catalytic oxidation using the main oxidant. The heterocyclic nitroxyl radical such as 2,2,6,6-tetra-methylpiperidinyl-1-oxy radical (TEMPO) can be activated for example by tertiary amine or chlorine dioxide, as is known from international publication WO2012/168562.

It has been also found that heterocyclic nitroxyl radicals such as 2,2,6,6-tetra-methylpiperidinyl-1-oxy radical (TEMPO) can be activated by hypochlorite from the stable radical form to the active oxidized form in a preliminary step, whereafter the catalytic oxidation of cellulose can proceed to the desired degree of oxidation by means of the catalyst and a main oxidant. This activation is performed in a separate preliminary step in the absence of cellulose.

In the cellulose oxidation step, the pretreated cellulose is oxidized in a reaction medium containing cellulose, the catalyst and main oxidant, preferably hypochlorite. The pH of the reaction medium is kept in the range favorable to the oxidation process by adding alkaline pH adjusting agent, for example sodium hydroxide. During the cellulose oxidation step, hypochlorite is added gradually to achieve the desired oxidation level of cellulose.

The cellulose oxidation step is performed preferably in the absence of bromide or iodide.

The cellulose oxidation step is preferably performed in pH values of 7-10, preferably 8-9.5. In the cellulose oxidation step, the pH is lower than is generally recommended for catalytic oxidation of cellulose when bromide is used as activator for the catalyst. The catalytic oxidation of cellulose by means of the catalyst and the main oxidant can be performed in optimum conditions in regard to structural integrity (DP value) of the cellulose.

In the oxidation process during the cellulose oxidation step, the cellulose is oxidized at C-6 carbons to carboxyl groups through the catalytic activity using a main oxidant, which provides the oxygen for the reaction and whose amount in relation to the amount of cellulose can be used to adjust the degree of conversion of the cellulose. Hypochlorite, such as sodium hypochlorite, can be used as the main oxidant. Residual aldehyde groups can be oxidized to carboxyl groups in a second step to complete the oxidation process and to attain a desired oxidation degree, expressed as carboxylate content (mmol COOH/g pulp). The second cellulose oxidation step is performed in acidic conditions using chlorite, such as sodium chlorite ($NaClO_2$) as oxidant.

The consistency of the pulp in the reaction medium where the oxidation is performed is preferably above 3%.

In fact, according to an advantageous embodiment, the reaction is performed at medium consistency of the pulp to increase selectivity. When medium consistency of the pulp is used, the selectivity of the cellulose oxidation can be improved, because the desired reactions take place in the fiber, whereas the unwanted side reactions take place in the solution phase.

The medium consistency is initial consistency of the cellulosic raw material that is higher than normally used. The consistency of the pulp is above 6%, especially above 6% and at the most 12%, more preferably equal to or higher than 8%, and most preferably in the range of 8-12% by weight. Within the last-mentioned range, the optimum consistency is supposed to be in the range of 9-11%. The consistency values are the initial consistency at the beginning of the oxidation.

However, the cellulose oxidation step can be performed even at pulp initial consistencies equal to or lower than 3%, for example in consistencies in the range of 2-4%.

After the cellulose oxidation step, the cellulose can be processed to a final cellulose product. When the starting material is pulp derived from plants, especially wood, the cellulose exists in fiber form. The fibers that contain the cellulose in oxidized form as a result of the oxidation process are easy to disintegrate by mechanical methods to small-scaled fragments, nanofibrillar cellulose (NFC). Thus, the method for forming the cellulose product comprises the alkaline pretreatment step of pulp raw material, the cellulose oxidation step using the pretreated pulp as raw material for the oxidation, and a disintegration step where the pulp is disintegrated to nanofibrillar cellulose.

BRIEF DESCRIPTION OF THE DRAWINGS

In the following, the invention will be described with reference to the appended drawings, where.

DETAILED DESCRIPTION OF THE PREFERRED EMBODIMENTS

Figure 1:
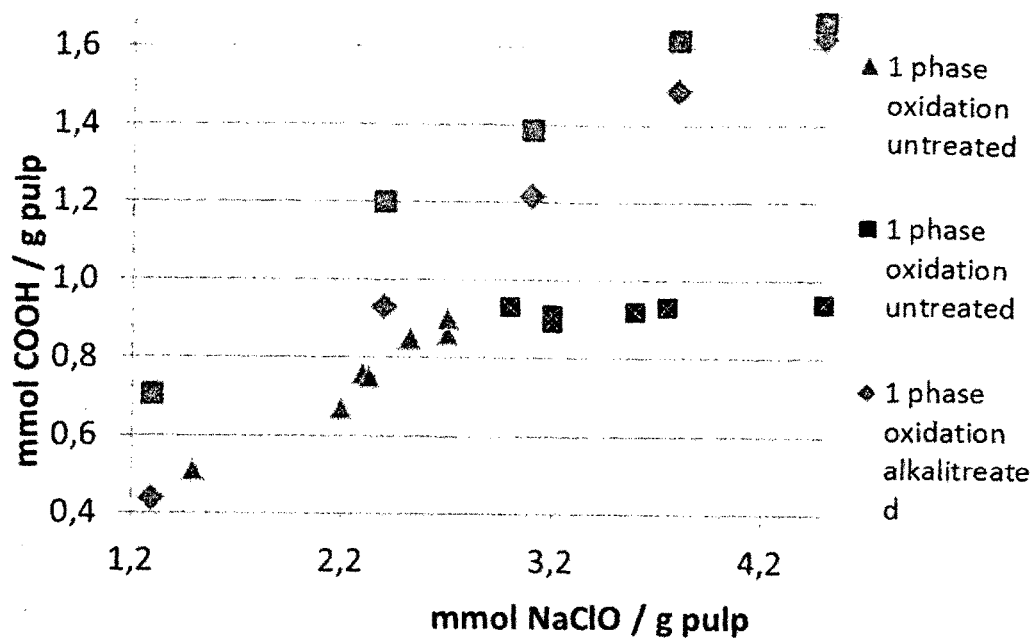
FIG. 1 shows the carboxylate contents of pulp as result of different oxidation methods.

In the following disclosure, all percent values are by weight, if not indicated otherwise. Further, all numerical ranges given include the upper and lower values of the ranges, if not indicated otherwise.

In the present application all results shown and calculations made, whenever they are related to the amount of pulp, are made on the basis of dry pulp.

In the method, the primary hydroxyl groups of cellulose in the pretreated cellulose are oxidized catalytically by a heterocyclic nitroxyl compound, for example 2,2,6,6-tetramethylpiperidinyl-1-oxy free radical, "TEMPO". Other heterocyclic nitroxyl compounds known to have selectivity in the oxidation of the hydroxyl groups of C-6 carbon of the glucose units of the cellulose can also be used, and these compounds are widely cited in the literature. Hereinafter, the oxidation of cellulose refers to the oxidation of these hydroxyl groups to aldehydes and carboxyl groups. Part of the hydroxyl groups that are subjected to oxidation can exist as aldehyde groups in the oxidized cellulose, or the oxidation to carboxyl groups can be complete. The oxidation level is in turn determined by the ratio of main oxidant to the cellulose.

Whenever the catalyst "TEMPO" is mentioned in this disclosure, it is evident that all measures and operations where "TEMPO" is involved apply equally and analogously to any derivative of TEMPO or any heterocyclic nitroxyl radical capable of catalyzing selectively the oxidation of the hydroxyl groups of C-6 carbon in cellulose.

In the following description, catalytic oxidation refers to nitroxyl-mediated (such as "TEMPO"-mediated) oxidation of hydroxyl groups. The catalytic oxidation of fibers or fibrous material in turn refers to material which contains cellulose that is oxidized by nitroxyl-mediated (such as "TEMPO"-mediated) oxidation of hydroxyl groups of the cellulose.

Pretreatment of Cellulose

The pretreatment of cellulose before the oxidation step comprises
- an alkaline pretreatment step, where the cellulose (such as pulp) is brought in contact with an aqueous alkaline solution having hydroxide concentration (molarity) of above 0.3 M, or pH value of at least 13.5, preferably at least 0.5 M or pH value of at least 13.7, and
- a subsequent washing step, where the pretreated cellulose is washed with water to lower its pH from that of the alkaline pretreatment solution, preferably to 12 or lower, but preferably keeping it still in the alkaline range, preferably 8-12, more preferably 9-11. However, if washing is continued long enough, the pH of the cellulose can be lowered even down to 7.

The duration of the alkaline pretreatment step can be relatively short to achieve the desired effect. Treatment times of 1 to 15 min are sufficient to activate the cellulose. The treatment time is also dependent on the amount of cellulose to be pretreated. In industrial-scale processes, treatment times of only 5 min can be expected.

Catalytic Oxidation of the Cellulose

The pretreated cellulose can next be oxidized catalytically using any known method. Due to the pretreatment, the reaction time is considerably shorter, less than half (½), preferably less than one third (⅓) of the time when non-pretreated cellulose is oxidized in identical conditions to the same conversion (oxidation level). The reaction time can be below one hour, and even below 30 min, whereas the reaction time to the same conversion can be over 2 hours without pretreatment.

The scheme of heterocyclic nitroxyl mediated cellulose oxidation (using "TEMPO" as example) is given below

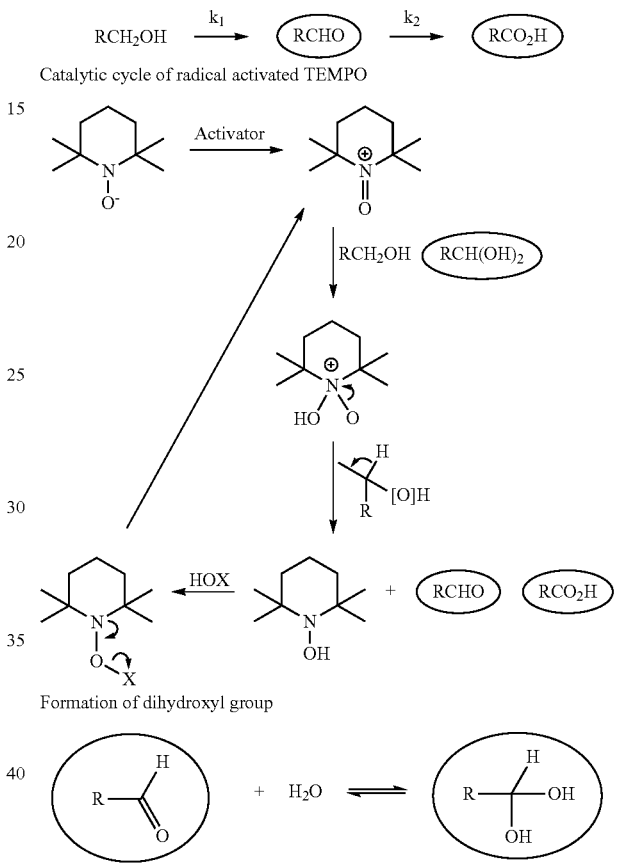

The heterocyclic nitroxyl compound used as catalyst in the oxidation process (such as "TEMPO") is stable in its neutral, radical form, and it can be stored in that form. The catalyst is activated to oxidized form, which can participate at once in the reaction as catalyst, and the oxidation process of the cellulose starts quickly.

The structural formula of "TEMPO" in its radical form is given below

TEMPO

Any known activator can be used for activating the stable radical-form catalyst. These activators include chlorine dioxide and chlorine gas, as is disclosed in WO2012/168562. The activation of the catalyst with chlorine dioxide gas or chlorine gas is performed as separate operation before the activated catalyst is introduced to the actual reaction medium containing the pretreated cellulosic raw material.

Alternatively, the activation of the catalyst can be performed with tertiary amine, especially cyclic tertiary amine, preferably selected from hexamethylenetetramine, 1,4-diazabicyclo[2,2,2]octane (DABCO) and quinuclidine, as also disclosed in WO2012/168562. The amine can be added in one dose to the reaction medium in the beginning of the oxidation or it can be dosed continuously to the reaction medium during the oxidation of the pretreated cellulosic raw material.

The above-mentioned activation methods, as the following to be introduced help to avoid the use of bromide or iodide in the oxidation and enable oxidation conditions which are more favorable for the selectivity and cellulose strength.

The heterocyclic nitroxyl radical can be alternatively activated in the preliminary activation step with hypochlorite so that it will be effective as catalyst in the oxidation of cellulose. The activation step is performed preferably in an aqueous medium using excess amount of hypochlorite with regard to the catalyst. The activation is performed at pH below 9, preferably 6-8. If sodium hypochlorite is used, the pH of the reaction medium is adjusted to suitable range with an acid, such as sulphuric acid. Organic acids or hydrochloric acid can also be used for the pH adjustment. The radical can be added to the medium after the pH adjustment, preferably in the molten state. Alternatively, the radical, preferably in molten state, can be dissolved first in the water or in the hypochlorite solution, and the pH can be adjusted thereafter.

The hypochlorite is used in the activation step preferably in the stoichiometric ratio of 1:1-3:1 to the heterocyclic nitroxyl radical. The hypochlorite is used preferably in excess, that is, the ratio is more than 1:1.

The oxidation method used for the pretreated cellulosic raw material is not limited to the above-described methods of activating the catalyst.

The reaction medium for oxidation of the cellulose comprises activated heterocyclic nitroxyl catalyst, cellulose, and main oxidant, which is preferably sodium hypochlorite. The oxidation process is performed in a reactor which is equipped with mixing of the reaction medium and control of reaction conditions. The catalyst and the main oxidant are added preferably to a fibrous suspension of cellulose fibres to achieve a desired starting consistency of the reaction medium. The consistency can be in the medium consistency range as described above, but lower consistencies can be used as well. The main oxidant can be added portion wise during the reaction. It is advantageous to add the main oxidant, such as hypochlorite, continuously as the oxidation of cellulose proceeds to avoid excess concentrations which may cause unwanted side reactions.

The pretreated cellulosic raw material is fibrous raw material, especially fibres of plant origin, which is suspended in the reaction medium and forms, when suspended in aqueous reaction medium, a pulp of given consistency. The fibers can be especially from wood. Chemical pulp, such as softwood or hardwood pulp, for example bleached birch pulp, can be used.

The oxidation reaction is allowed to proceed till a required conversion degree (oxidation level) has been achieved. As expressed in carboxylate groups generated as the result of oxidation, this is normally 0.5-1.6 mmol COOH/g pulp, calculated as dried pulp.

For the purpose of making NFC, it has been found that the oxidation level (conversion degree) of 0.5-1.1 mmol COOH/g pulp, preferably 0.6-0.95 and most preferably 0.7-0.9 is already sufficient that the cellulose fibers can be easily disintegrated to fibrils by mechanical energy.

The dosage of hypochlorite to cellulose, to reach the above-mentioned conversions, can be 1.7 to 5 mmol/g pulp, preferably 2.2-2.7 mmol/g pulp.

The consistency of the pulp in the reaction medium where the oxidation is performed is preferably above 3%.

In fact, according to an advantageous embodiment, the reaction is performed at medium consistency of the pulp to increase selectivity. When medium consistency of the pulp is used, the selectivity of the cellulose oxidation can be improved, because the desired reactions take place in the fiber, whereas the unwanted side reactions take place in the solution phase.

The medium consistency is initial consistency of the cellulosic raw material that is higher than normally used. The consistency of the pulp is above 6%, especially above 6% and at the most 12%, more preferably equal to or higher than 8%, and most preferably in the range of 8-12% by weight. Within the last-mentioned range, the optimum consistency is supposed to be in the range of 9-11%. The consistency values are the initial consistency at the beginning of the oxidation.

In all above-described embodiments the catalytic oxidation can be performed without the use of bromide. Sodium bromide, which is conventionally used as activator and cocatalyst because of the faster reaction rate and high degree of oxidation, can be avoided in the catalytic oxidation process according to still one embodiment. Conventionally, the optimum pH when sodium bromide is used is 10. However, side reactions occur at this pH which cannot be avoided even at the relatively fast reaction rate. The DP value (degree of polymerization) will decrease considerably, which decreases the strength characteristics and gel forming ability of the NFC.

Thus, according to still one embodiment, the catalytic non-bromine oxidation with the heterocyclic nitroxyl catalyst of the pretreated cellulose raw material, preferably performed at the above mentioned medium consistency of the cellulosic raw material, can be performed by using carefully defined conditions with regard to pH and temperature. The reaction is performed in neutral or slightly alkaline pH, at 7-10, more preferably in the range of 8-9.5, and at room temperature or slightly elevated temperature, in the range of 15-50° C., preferably 20-40° C., most preferably 26-35° C., in the absence of added alkali metal halide (bromide or iodide). The selectivity (less C2 and C3 reactions) is improved, and bromine compounds are avoided. The slower oxidation reaction rate due to the lower pH is compensated by the temperature, which does not increase the side reactions as much as the higher pH.

Temperature control can be used to keep the temperature within the above ranges during the reaction. Because the oxidation is exothermic, the temperature of the reaction medium will rise if cooling is not provided. The rise is about 10° C. between the start and the end point. Thus, in the range of 15-50° C. the reaction can start below at 30° C. and end below 40° C., for example start at 24-26° C. and end at 34-36° C.

When the cellulose oxidation step using the heterocyclic nitroxyl catalyst has proceeded so that a desired conversion degree is reached, the oxidation step is stopped. The oxidized cellulose is separated from the reaction medium and washed. The catalyst left in the reaction medium can be reused, for example it can reactivated with hypochlorite for a new cellulose oxidation step.

During the catalytic oxidation, part of the hydroxyl groups of the cellulose in C-6 carbon are oxidized incompletely to aldehydes. If aldehydes are not wanted in the oxidation product, the oxidation can be completed by oxidizing the aldehyde groups to carboxylate groups in a second, complementary cellulose oxidation step, using different reaction conditions.

The second, complementary oxidation step for converting the residual aldehydes to carboxylates to reach the final carboxylate content is performed in a reaction medium where the pH is clearly on acidic side, about 1.5-4, preferably 2-3. Preferably the second step is performed at a pH below 3. The oxidized cellulose separated from the reaction medium of the cellulose oxidation step is mixed with the new reaction medium. Alternatively, the pH of the reaction medium of the cellulose oxidation step can be lowered directly to the pH range of the second, complementary oxidation step at the stop point of the preceding cellulose oxidation step.

In the second, complementary oxidation chlorite, for example sodium chlorite, is used as oxidant, according to the scheme shown below. The chlorite is in the form of chlorous acid ($HClO_2$, pKa 1.96) in the acidic conditions. The chlorous acid oxidizes the aldehyde groups of the cellulose to carboxylic acid groups.

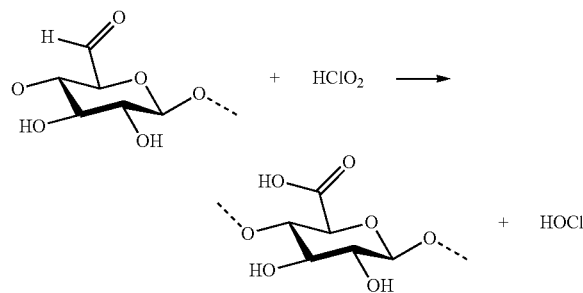

Dimethyl sulfoxide (DMSO) can be used in the reaction medium in the second complementary oxidation step to eliminate the formation of hypochlorite from chlorite.

Thus, it is possible to complete the oxidation in the second step to obtain cellulose with the target oxidation levels (COOH/g pulp).

Instead of a second oxidation step, it is also possible to perform a reduction step where the aldehyde groups are reduced back to hydroxyl groups by using a suitable reducing agent, such $NaBH_4$.

The oxidized cellulose obtained form the cellulose oxidation step can be processed further. According to an advantageous embodiment the oxidized cellulose is made to nanofibrillar cellulose (NFC) by known methods, which involve disintegrating the fibres of oxidized cellulose to fibrils.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of the oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer.

The NFC prepared from cellulose raw material oxidized catalytically in the cellulose oxidation step, as described in the present disclosure, has excellent gelling ability, which means that it forms a gel at a low consistency in aqueous medium. For example when the oxidized pulp is ground at a consistency of about 1 to 4% in aqueous medium, a clear gel consisting of microfibrils in water (NFC gel) is obtained.

The fibril cellulose is preferably made of plant material that has been subjected to the pretreatment and oxidation to convert the hydroxyl groups of the cellulose to carboxyl groups with a conversion degree that enhances the disintegration of the material to nanofibrillar cellulose, as discussed above One preferred alternative is to obtain the microfibrils form non-parenchymal plant material where the fibrils are obtained from secondary cell walls. One abundant source of cellulose fibrils is wood fibres. The nanofibrillar cellulose can thus be manufactured by homogenizing oxidized wood-derived fibrous raw material, which may be chemical pulp. The pulp can be for example softwood pulp or hardwood pulp or a mixture of these. The fibrils originating in secondary cell walls are essentially crystalline with degree of crystallinity of at least 55%.

EXAMPLES

The following examples, which shall not be regarded as restrictive, illustrate the pretreatment method of the cellulose and its subsequent processing steps further.

The reaction time is expressed as period of consumption of hypochlorite (that is, the oxidation time of cellulose) in the cellulose oxidation step.

Alkaline treatments with birch pulp were executed in different alkaline concentrations and reaction times before TEMPO mediated pulp oxidations. When pulp was treated with NaOH concentration >0.3 M even for a short time (minutes) and washed to pH 9, reaction rate improved considerably. Reaction time decreased from 2.5 hours to 0.5 hour. In addition, efficiency of NaOCl consumption increased at least 10%, being >80% or even >85% and even when highest hypochlorite dosages were used. According to the preliminary testing it was obvious that alkaline treatments by 1 M NaOH (pH 14) were more effective than those executed by more diluted NaOH. Treatment at 0.1M NaOH (pH 13) did not improve the selectivity of TEMPO mediated pulp oxidation. Moreover, washing of pulp after the alkaline treatment was important due to the reversible nature of cellulose-I conversion to Na-cellulose-I. Highest reaction rates of TEMPO mediated oxidations were reached by alkaline treatments with 1 M NaOH (reaction time was not significant) and washing of pulp to pH 9. Thus, there was some NaOH residue probably available in fibers after washing. Improvement of reaction rate of TEMPO mediated pulp oxidation was substantial due to the alkaline residue and/or Na-cellulose-I lattice. Ideal pH region of TEMPO mediated pulp oxidation is 8-9. NaClO decomposes faster if pH is lower (<8) and undesirable oxidation of C2 and C3 secondary hydroxyls of cellulose to ketones takes place if pH is higher (>9).

Different alkaline concentrations and reaction times of the alkaline treatment are compared in Table 1. Most effective alkaline treatment was done by 1 M NaOH (pH 14). Reaction time of TEMPO mediated oxidation reduced from 2.5 hours to 0.5 hours. Selectivity (mmol COOH/mmol NaClO) of pulp no. 2 was also highest of all measured pulps. Different alkaline treatment times and NaClO/TEMPO dosages are compared in Table 2. Reaction rate of TEMPO mediated oxidation does not increase when alkaline treatment time increases from 1 min to 240 min. Decreasing of TEMPO addition from 0.05 to 0.028 mmol/g pulp increases reaction time from 27 to 65 min, which is still much lower than the reference value (pulp no. 1, 155 min). Slight decrease of selectivity (pulp no. 6, lower TEMPO dosage) can be compensated by slight increase of NaClO dosage. Alkaline treatment in 0.25 M does not yet affect the reaction rate, but treatment in 0.5 M NaOH already decreases the reaction time and increases selectivity (Table 3). Outstandingly, after the alkali treatment, efficiency of the reaction remain even when higher NaClO dosages are used (Table 4). This is totally opposite to not treated reference samples, FIG. 1.

Example 1 Reference Oxidation (Pulp No. 1), No Alkaline Treatment

Activation of Radical TEMPO 0.375 g radical TEMPO was weighted and transferred to closed glass bottle. 50 ml of water was added to bottle. 4 ml of NaClO (12.9%) solution was added to TEMPO solution. pH of TEMPO solution was adjusted to 7.5 by 1 M $H_2SO_4$ using pH meter. Solution was mixed strongly until all radical TEMPO was dissolved.

HOCl Activated TEMPO Oxidation 243 g (48 g as dry) never-dried birch pulp was weighted in closed vessel. Activated TEMPO solution was mixed with pulp. Pulp was shifted to Buchi reactor and 819 ml water was mixed with pulp. Temperature of pulp was set to 18° C. 63 ml (12.9%) NaClO was added to reactor by pump while pulp was mixed strongly. NaClO addition was over after 13 min. pH was kept under 9 during NaClO addition by controlling pumping speed. Temperature of pulp was lifted to 25° C. after NaClO addition and pH was controlled by titrator (pH 9, 1 M NaOH) until all NaClO was consumed (after 152 min). Active chlorine titration was used to monitor NaClO consumption during oxidation process. Strong mixing was continued until all NaClO was consumed. Pulp was washed with ion-changed water after oxidation. CED-viscosity and carboxylate content of pulp (conductometric titration) was determined after pulp consistency determination.

Conversion of Residual Aldehydes to Carboxylates by Acidic Phase Oxidation 10 g (calculated as dry) of TEMPO oxidized pulp was weighted and shifted to Buchi reactor. Pulp was diluted by 1000 ml of water. 0.6 g $NaClO_2$ and 2 ml DMSO was mixed with pulp solution. pH of solution was adjusted to 3 by 1 M $H_2SO_4$ using pH meter. Temperature of pulp solution was adjusted to 50° C. and solution was mixed 2 hours until oxidation was ready. Pulp was washed with ion-changed water after oxidation. CED-viscosity and carboxylate content of pulp (conductometric titration) was determined after pulp consistency determination.

Example 2 Alkaline Treatment of Birch Pulp in 1M NaOH and Subsequent Washing

Alkaline Treatment 700 g (65.66 g abs dry) of never-dry pulp together with 155 ml of 8M NaOH solution and 635 ml of additional water was added to a large beaker to obtain 5% consistency and 1M NaOH concentration. The mixing began immediately after NaOH addition with a mechanical mixer. The temperature of the slurry was measured during the initial state of the mixing.

Washing to pH 9

After the treatment time (15 minutes), the pulp slurry was transferred to a wire bag and immediately washed with deionized water. The pH of the pulp slurry was determined at around 5% consistency. The washing was continued until the pH of the pulp slurry was around 9. Then, excess of water was removed manually to obtain a higher consistency of the pulp. The pulp was mechanically disintegrated prior to the following oxidation stage.

Example 3 Oxidation after Alkali Treatment and Washing/Medium Carboxylate Content (Pulp No. 2)

Activation of Radical TEMPO 0.375 g radical TEMPO was weighted and transferred to closed glass bottle. 50 ml of water was added to bottle. 4 ml of NaClO (13.1%) solution was added to TEMPO solution. pH of TEMPO solution was adjusted to 7.5 by 1 M $H_2SO_4$ using pH meter. Solution was mixed strongly until all radical TEMPO was dissolved.

HOCl Activated TEMPO Oxidation 226 g (46 g as dry) alkali treated never-dried birch pulp was weighted in closed vessel. Activated TEMPO solution was mixed with pulp. Pulp was shifted to Buchi reactor and 839 ml water was mixed with pulp. Temperature of pulp was set to 18° C. 60 ml (13.1%) NaClO was added to reactor by pump while pulp was mixed strongly. NaClO addition was over after 14 min. pH was kept under 9 during NaClO addition by controlling pumping speed. Temperature of pulp was lifted to 25° C. after NaClO addition and pH was controlled by titrator (pH 9, 1 M NaOH) until all NaClO was consumed (after 31 min). Active chlorine titration was used to monitor NaClO consumption during oxidation process. Strong mixing was continued until all NaClO was consumed. Pulp was washed with ion-changed water after oxidation. CED-viscosity and carboxylate content of pulp (conductometric titration) was determined after pulp consistency determination.

Conversion of residual aldehydes to carboxylates by acidic phase oxidation as described in Example 1

Example 4 Oxidation after Alkali Treatment and Washing/High Carboxylate Content (Pulp No. 14)

Activation of Radical TEMPO 0.375 g radical TEMPO was weighted and transferred to closed glass bottle. 50 ml of water was added to bottle. 4 ml of NaClO (13.3%) solution was added to TEMPO solution. pH of TEMPO solution was adjusted to 7.5 by 1 M $H_2SO_4$ using pH meter. Solution was mixed strongly until all radical TEMPO was dissolved.

HOCl Activated TEMPO Oxidation 269 g (48 g as dry) alkali treated never-dried birch pulp was weighted in closed vessel. Activated TEMPO solution was mixed with pulp. Pulp was shifted to Buchi reactor and 839 ml water was mixed with pulp. Temperature of pulp was set to 18° C. 100 ml (13.3%) NaClO was added to reactor by pump while pulp was mixed strongly. NaClO addition was over after 19 min. pH was kept under 9 during NaClO addition by controlling pumping speed. Temperature of pulp was lifted to 25° C. after NaClO addition and pH was controlled by titrator (pH 9, 1 M NaOH) until all NaClO was consumed (after 124 min). Active chlorine titration was used to monitor NaClO consumption during oxidation process. Strong mixing was continued until all NaClO was consumed. Pulp was washed with ionchanged water after oxidation. CED-viscosity and carboxylate content of pulp (conductometric titration) was determined after pulp consistency determination.

Conversion of residual aldehydes to carboxylates by acidic phase oxidation as described in Example 1

Example 5 Fluidisation of Different Oxidized Pulps

Microfluidics M110P

Pulp consistency of pulp sample was adjusted to approximately 1.5% by water. Sample was mixed by Turrex 10 min. pH was adjusted to 9 by NaOH and pH meter. Pulp solution was forced by 2000 bar pressure through 200 μm chamber and 100 μm chamber (=1 pass). Pulp dispersion formed a gel in fluidization.

Kitchen Blender Philips HR2084 (650 W)

1-3 g of oxidized pulp was added to kitchen blender. Pulp was mixed by full speed and water was added to mixing chamber by small portions between mixing pulses. Some drops of 1 M NaOH was added to pulp mixture if pH was lower than 8. After some mixing pulses pulp was gelating (high carboxylate pulps)

TABLE 1

HOCl activated TEMPO oxidations by alkali treated birch pulp. Different alkaline concentrations and reaction times are compared during the alkaline treatment.

| Experiment (pulp no.) | 1. | 2. | 3. | 4. |
|---|---|---|---|---|
| Reaction time (min) | 152 | 31 | 155 | 155 |
| HOCl addition (mmol NaClO/g pulp) | 2.4 | 2.4 | 2.4 | 2.4 |
| TEMPO addition (mmol/g pulp) | 0.05 | 0.05 | 0.05 | 0.05 |
| mmol COOH/g pulp (1 stage oxidation) | 0.90 | 0.93 | 0.85 | 0.90 |
| mmol COOH/g pulp (2 stage oxidation) | 1.02 | 1.20 | 1.02 | 1.02 |
| CED-viscosity (ml/g) (1 stage oxidation) | 188 | 133 | 151 | 180 |
| CED-viscosity (ml/g) (2 stage oxidation) | 417 | 366 | 343 | 424 |
| Selectivity after 2 phase (mmol COOH/mmol NaClO) | 0.40 | 0.43 | 0.38 | 0.39 |
| Temperature (° C.) | 25 | 25 | 25 | 25 |
| pH | 9 | 9 | 9 | 9 |
| Dried (D) or never dried (ND) birch pulp | ND | ND | D | ND |

(1.) HOCl activated TEMPO oxidation
(2.) HOCl activated TEMPO oxidation - alkalitreament of pulp by 1M NaOH (15 min) → washing to pH 9
(3.) HOCl activated TEMPO oxidation - alkalitreatment of pulp/pH 11.5 (120 min) → washing to pH 9
(4.) HOCl activated TEMPO oxidation -alkalitreatment of pulp by 0.1M NaOH (15 min) → washing to pH 9

TABLE 2

HOCl activated TEMPO oxidations by alkaline treated birch pulp. Different alkaline treatment times and NaClO/TEMPO dosages are compared.

| Experiment | 1. | 2. | 5. | 6. | 7. | 8. |
|---|---|---|---|---|---|---|
| Reaction time (min) | 152 | 31 | 27 | 65 | 17 | 27 |
| HOCl addition (mmol NaClO/g pulp) | 2.4 | 2.4 | 2.4 | 2.4 | 1.3 | 2.4 |
| TEMPO addition (mmol/g pulp) | 0.05 | 0.05 | 0.05 | 0.028 | 0.025 | 0.05 |
| mmol COOH/g pulp (1 stage oxidation) | 0.90 | 0.93 | 0.92 | 0.86 | 0.43 | 0.90 |
| mmol COOH/g pulp (2 stage oxidation) | 1.02 | 1.20 | 1.18 | 1.12 | 0.71 | 1.12 |
| CED-viscosity (ml/g) (1 stage oxidation) | 188 | 133 | 139 | 147 | 147 | 142 |
| CED-viscosity (ml/g) (2 stage oxidation) | 417 | 366 | 415 | 421 | 341 | 399 |
| Selectivity after 2 phase (mmol COOH/mmol NaClO) | 0.40 | 0.43 | 0.42 | 0.41 | 0.43 | 0.42 |
| Temperature (° C.) | 25 | 25 | 25 | 25 | 25 | 25 |
| pH | 9 | 9 | 9 | 9 | 9 | 9 |
| Dried (D) or never dried (ND) birch pulp | ND | ND | ND | ND | ND | ND |
| NaOH activation time | | 15 | 1 | 5 | 15 | 240 |

(1.) HOCl activated TEMPO oxidation
(2.) HOCl activated TEMPO oxidation - alkalitreament of pulp by 1M NaOH (15 min) → washing to pH 9

TABLE 3

HOCl activated TEMPO oxidations by alkaline treated birch pulp.
Effect of sodium hydroxide concentration in washing treatment.

| Experiment | 9. | 10. | 11. | 2. | 12. |
|---|---|---|---|---|---|
| Reaction time (min) | 151 | 55 | 32 | 31 | 22 |
| HOCl addition (mmol NaClO/g pulp) | 2.4 | 2.4 | 2.4 | 2.4 | 2.4 |
| TEMPO addition (mmol/g pulp) | 0.05 | 0.05 | 0.05 | 0.05 | 0.05 |
| mmol COOH/g pulp (1 stage oxidation) | 0.92 | 0.88 | 0.89 | 0.93 | 0.91 |
| mmol COOH/g pulp (2 stage oxidation) | 1.01 | 1.09 | 1.12 | 1.20 | 1.17 |
| Δ mmol COOH/g pulp (2-1 stage oxidation) | 0.09 | 0.20 | 0.23 | 0.27 | 0.26 |
| CED-viscosity (ml/g) (1 stage oxidation) | 191 | 183 | 161 | 133 | 100 |
| CED-viscosity (ml/g) (2 stage oxidation) | 435 | 400 | 445 | 366 | 306 |
| Selectivity after 2 phase (mmol COOH/mmol NaClO) | 0.39 | 0.40 | 0.41 | 0.43 | 0.43 |
| Temperature (° C.) | 25 | 25 | 25 | 25 | 25 |
| pH | 9 | 9 | 9 | 9 | 9 |
| Dried (D) or never dried (ND) birch pulp | ND | ND | ND | ND | ND |
| NaOH activation time (min) | 15 | 15 | 15 | 15 | 15 |

(1.) HOCl activated TEMPO oxidation - alkaliwashed pulp 0.25M NaOH → 9
(2.) HOCl activated TEMPO oxidation - alkaliwashed pulp 0.5M NaOH → 9
(3.) HOCl activated TEMPO oxidation - alkaliwashed pulp 0.75M NaOH → 9
(4.) HOCl activated TEMPO oxidation - alkaliwashed pulp 1M NaOH → 9
(5.) HOCl activated TEMPO oxidation - alkaliwashed pulp 1.5M NaOH → 9

TABLE 4

HOCl activated TEMPO oxidations by alkaline treated birch pulp. Different NaClO/TEMPO dosages are compared.

| Experiment | 7. | 2. | 13. | 14. | 15. |
|---|---|---|---|---|---|
| Reaction time (min) | 17 | 31 | 50 | 124 | 232 |
| HOCl addition (mmol NaClO/g pulp) | 1.3 | 2.4 | 3.1 | 3.8 | 4.5 |
| TEMPO addition (mmol/g pulp) | 0.025 | 0.05 | 0.05 | 0.05 | 0.05 |
| mmol COOH/g pulp (1 stage oxidation) | 0.43 | 0.93 | 1.21 | 1.49 | 1.62 |
| mmol COOH/g pulp (2 stage oxidation) | 0.71 | 1.20 | 1.39 | 1.62 | 1.67 |
| Δ mmol COOH/g pulp (2-1 stage oxidation) | 0.27 | 0.27 | 0.17 | 0.13 | 0.04 |
| CED-viscosity (ml/g) (1 stage oxidation) | 147 | 133 | 131 | 135 | |
| CED-viscosity (ml/g) (2 stage oxidation) | 341 | 366 | 351 | 327 | |
| Selectivity after 2 phase (mmol COOH/mmol NaClO) | 0.43 | 0.43 | 0.41 | 0.40 | 0.36 |
| Temperature (° C.) | 25 | 25 | 25 | 25 | 25 |
| pH | 9 | 9 | 9 | 9 | 9 |
| Dried (D) or never dried (ND) birch pulp | ND | ND | ND | ND | ND |
| NaOH activation time (min) | 15 | 15 | 15 | 15 | 15 |

(1.) HOCl activated TEMPO oxidation - alkaliwashed pulp 1M NaOH → pH 9

Alkaline treatment decreases reaction time of TEMPO mediated pulp oxidation drastically. Moreover, the selectivity of pulp oxidation increases slightly. Higher amount of residual aldehydes, which are converted to carboxylates during the 2 stage oxidation, indicates that alkali treated pulp can be oxidised easily to high carboxylate contents. Alkaline treatment can be used to lower catalyst consumption, which is quite expensive expenditure during the pulp oxidation, because shorter reaction time decreases NaClO decomposition.

Described alkali treatment is very mild treatment and does not change cellulose structure irreversibly. This treatment should not be confused with mercerization or other harsh alkali treatments. Thus, treatment does not affect substantially properties of oxidised cellulose pulp e.g. decrease degree of polymerization.

Example 6 Oxidation after Alkali Treatment and Washing/Pulp Alkalitreated with 1 M NaOH and Washed to Neutral pH Alkaline Treatment 700 g (65.66 g abs dry) of never-dry pulp together with 155 ml of 8M NaOH solution and 635 ml of additional water was added to a large beaker to obtain 5% consistency and 1M NaOH concentration. The mixing began immediately after NaOH addition with a mechanical mixer. The temperature of the slurry was measured during the initial state of the mixing.

Washing to pH 7

After the treatment time (15 minutes), the pulp slurry was transferred to a wire bag and immediately washed with deionized water. The pH of the pulp slurry was determined at around 5% consistency. The washing was continued until the pH of the pulp slurry was around 8. Final pH adjustment from 8 to 7 was done by diluted sulfuric acid solution. Then, excess of water was removed manually to obtain a higher consistency of the pulp. The pulp was mechanically disintegrated prior to the following oxidation stage.

HOCl activated TEMPO oxidation 222 g (48 g as dry) alkalitreated never-dried birch pulp was weighted in closed vessel. Activated TEMPO solution (as in Example 3) was mixed with pulp. Pulp was shifted to Buchi reactor and 839 ml water was mixed with pulp. Temperature of water bath (which controls the reactor) was set to 18° C. 64 ml (13.1%) NaClO was added to reactor by pump while pulp was mixed strongly. NaClO addition was over after 13 min. pH was kept under 9 during NaClO addition by controlling pumping speed. Temperature of water bath was set to 25° C. after NaClO addition and pH was controlled by titrator (pH 9, 1 M NaOH) until all NaClO was consumed (after 33 min). Active chlorine titration was used to monitor NaClO consumption during oxidation process. Strong mixing was continued until all NaClO was consumed. Pulp was washed with deionized water after oxidation. CED-viscosity and carboxylate content of pulp (conductometric titration) was determined after pulp consistency determination. Carboxylate content of pulp after oxidation was 0.92 mmol COOH/g pulp.

Conversion of residual aldehydes to carboxylates by acidic phase oxidation as described in Example 1. Carboxylate content of pulp after 2 stage oxidation was 1.17 mmol COOH/g pulp.

Example 7 Oxidation after Alkali Washing Treatment/Pulp Alkalitreated with 1 M NaOH and Washed to pH 8

Alkaline Treatment 700 g (65.66 g abs dry) of never-dry pulp together with 155 ml of 8M NaOH solution and 635 ml of additional water was added to a large beaker to obtain 5% consistency and 1M NaOH concentration. The mixing began immediately after NaOH addition with a mechanical mixer. The temperature of the slurry was measured during the initial state of the mixing.

Washing to pH 8

After the treatment time (15 minutes), the pulp slurry was transferred to a wire bag and immediately washed with deionized water. The pH of the pulp slurry was determined at around 5% consistency. The washing was continued until pulp was neutralized by 25 washings by deionized water. Then, excess of water was removed manually to obtain a higher consistency of the pulp. The pulp was mechanically disintegrated prior to the following oxidation stage.

HOCl Activated TEMPO Oxidation 210 g (48 g as dry) alkalitreated never-dried birch pulp was weighted in closed vessel. Activated TEMPO solution (as in Example 3) was mixed with pulp. Pulp was shifted to Buchi reactor and 852 ml water was mixed with pulp. Temperature of water bath (which controls the reactor) was set to 18° C. 63 ml (13.1%) NaClO was added to reactor by pump while pulp was mixed strongly. NaClO addition was over after 9 min. pH was kept under 9 during NaClO addition by controlling pumping speed. Temperature of water bath was set to 25° C. after NaClO addition and pH was controlled by titrator (pH 9, 1 M NaOH) until all NaClO was consumed (after 27 min). Active chlorine titration was used to monitor NaClO consumption during oxidation process. Strong mixing was continued until all NaClO was consumed. Pulp was washed with deionized water after oxidation. CED-viscosity and carboxylate content of pulp (conductometric titration) was determined after pulp consistency determination. Carboxylate content of pulp after oxidation was 0.91 mmol COOH/g pulp.

Conversion of residual aldehydes to carboxylates by acidic phase oxidation as described in Example 1. Carboxylate content of pulp after 2 stage oxidation was 1.16 mmol COOH/g pulp.

Example 8 Oxidation after Alkali Washing Treatment/Pulp Alkali Treated with 3 M NaOH Alkaline Treatment 700 g (65.66 g abs dry) of never-dry pulp together with 465 ml of 8M NaOH solution and 325 ml of additional water was added to a large beaker to obtain 5% consistency and 1M NaOH concentration. The mixing began immediately after NaOH addition with a mechanical mixer. The temperature of the slurry was measured during the initial state of the mixing.

Washing to pH 9

After the treatment time (15 minutes), the pulp slurry was transferred to a wire bag and immediately washed with deionized water. The pH of the pulp slurry was determined at around 5% consistency. The washing was continued until the pH of the pulp slurry was around 9. Then, excess of water was removed manually to obtain a higher consistency of the pulp. The pulp was mechanically disintegrated prior to the following oxidation stage.

HOCl Activated TEMPO Oxidation 244 g (48 g as dry) alkalitreated never-dried birch pulp was weighted in closed vessel. Activated TEMPO solution (as in Example 3) was mixed with pulp. Pulp was shifted to Buchi reactor and 821 ml water was mixed with pulp. Temperature of water bath (which controls the reactor) was set to 18° C. 61 ml (13.1%) NaClO was added to reactor by pump while pulp was mixed strongly. NaClO addition was over after 7 min. pH was kept under 9 during NaClO addition by controlling pumping speed. Temperature of water bath was set to 25° C. after NaClO addition and pH was controlled by titrator (pH 9, 1 M NaOH) until all NaClO was consumed (after 18 min). Active chlorine titration was used to monitor NaClO consumption during oxidation process. Strong mixing was continued until all NaClO was consumed. Pulp was washed with deionized water after oxidation. CED-viscosity and carboxylate content of pulp (conductometric titration) was determined after pulp consistency determination. Carboxylate content of pulp after oxidation was 0.86 mmol COOH/g pulp.

Conversion of residual aldehydes to carboxylates by acidic phase oxidation as described in Example 1. Carboxylate content of pulp after 2 stage oxidation was 1.20 mmol COOH/g pulp.

Figure 2:
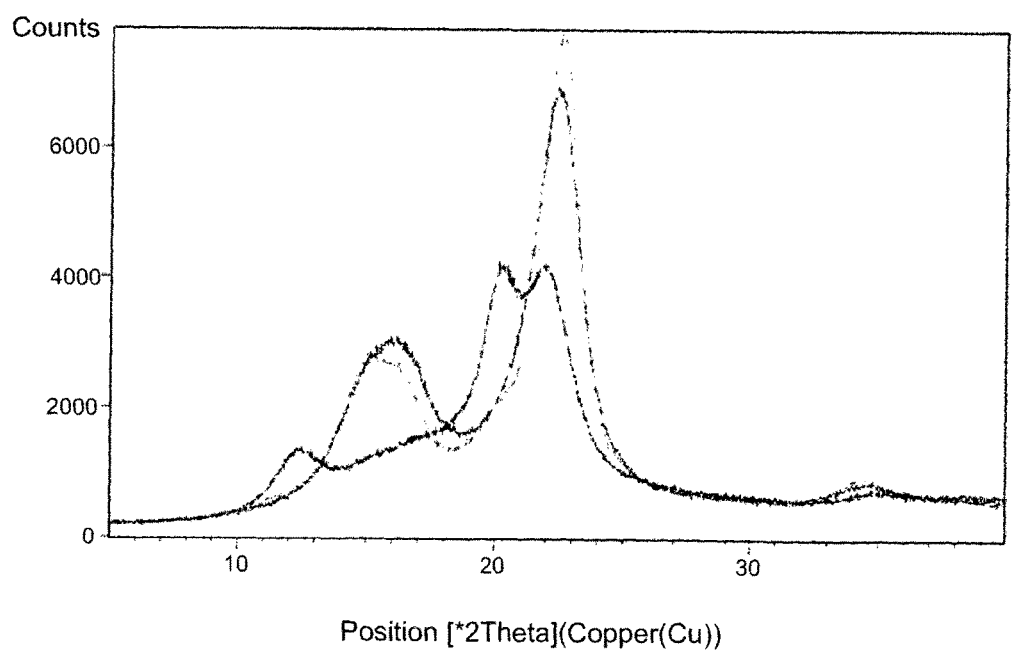
FIG. 2 shows the crystallinity of cellulose in pulps treated with different concentrations of alkali metal hydroxide.

The effect of the hydroxide concentration in the alkaline pretreatment is shown in FIG. 2. Crystallinities of various pretreated pulps were measured with X-ray diffraction. Crystallinities of the reference pulp (curve with highest peak, Example 1), pulp treated with 1.0 M NaOH (curve with second-highest peak, example 2), and pulp treated with 3.0 M NaOH (curve with low double-peak, example 8) are compared. It can be seen from the X-ray diffraction curves that the curves of the reference pulp and pulp treated with 1.0 M NaOH coincide almost completely, whereas curve of the pulp treated with 3.0M NaOH deviates from them and indicates the presence of cellulose II.

In order to characterize NFC gel, turbidity and Brookfield viscosity were measured.

Turbidity may be measured quantitatively using optical turbidity measuring instruments. There are several commercial turbidometers available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted in water, to a concentration below the gel point of said nanofibrillar cellulose, and turbidity of the diluted sample is measured. Said concentration where the turbidity of the nanofibrillar cellulose samples is measured is 0.1%. HACH P2100 Turbidometer with a 50 ml measuring vessel is used for turbidity measurements. The dry matter of the nanofibrillar cellulose sample is determined and 0.5 g of the sample, calculated as dry matter, is loaded in the measuring vessel, which is filled with tap water to 500 g and vigorously mixed by shaking for about 30 s. Without delay the aqueous mixture is divided into 5 measuring vessels, which are inserted in the turbidometer. Three measurements on each vessel are carried out The mean value and standard deviation are calculated from the obtained results, and the final result is given as NTU units.

Brookfield Viscosity

The apparent viscosity of NFC is measured with a Brookfield viscometer (Brookfield viscosity) or another corresponding apparatus. Suitably a vane spindle (number 73) is used. There are several commercial Brookfield viscometers available for measuring apparent viscosity, which all are based on the same principle. Suitably RVDV spring (Brookfield RVDV-III) is used in the apparatus. A sample of the nanofibrillar cellulose is diluted to a concentration of 0.8% by weight in water and mixed for 10 min. The diluted sample mass is added to a 250 ml beaker and the temperature is adjusted to 20° C.±1° C., heated if necessary and mixed. A low rotational speed 10 rpm is used.

Rheometer Viscosity

The NFC of is diluted with deionised water to a concentration of 0.5 w % and 200 g of the mixture is homogenised with a Buchi-mixer (B-400, max 2100 W, Büchi Labortechnik AG, Switzerland) for 3×10 s.

The viscosity of the NFC dispersions is measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they are allowed to rest for 5 min before the measurement is started. The steady state viscosity is measured with a gradually increasing shear stress (proportional to applied torque) and the shear rate (proportional to angular velocity) is measured. The reported viscosity (=shear stress/shear rate) at a certain shear stress is recorded after reaching a constant shear rate or after a maximum time of 2 min. The measurement is stopped when a shear rate of $1000\ s^{-1}$ is exceeded. The method is used for determining zero-shear viscosity.

The oxidized cellulose according to Example 3 (pulp no. 2) was disintegrated to nanofibrillar cellulose with fluidizer according to Example 5. The turbidity of the sample was 32 NTU, the Brookfield viscosity was 19 600 mPa·s, and the zero-shear viscosity of the sample was 15 000 Pa·s and yield stress was 11 Pa, as measured with rheometer.

One oxidized cellulose of table 2 (pulp no. 6) was disintegrated to nanofibrillar cellulose with fluidizer according to Example 5. The turbidity of the sample was 27 NTU and the Brookfield viscosity was 9370 mPa·s.

Target properties of the NFC prepared from the oxidized pulp

Typically in the method, the aim is to obtain, as the final product, nanofibrillar cellulose whose Brookfield viscosity, measured at a consistency of 0.8% and at a rotation speed of 10 rpm, is at least 5,000 mPa·s, advantageously at least 15,000. The viscosity is advantageously in the range of 5,000 to 40,000 mPa·s. The aqueous nanofibrillar cellulose dispersions obtained are also characterized by so-called shear thinning behavior; that is, the viscosity decreases as the shear rate increases.

Furthermore, the aim is to obtain nanofibrillar cellulose whose turbidity is typically lower than 90 NTU, for example from 3 to 90 NTU, preferably from 5 to 60, more preferably 8-40 measured at a consistency of 0.1 wt % (aqueous medium), and measured by nephelometry.

Furthermore, the aim is obtain shear thinning nanofibrillar cellulose having a zero shear viscosity ("plateau" of constant viscosity at small shearing stresses) in the range of 1,000 to 100,000 Pas, preferably 5,000 to 50,000 and a yield stress (shear stress where shear thinning begins) in the range of 1 to 50 Pa, advantageously in the range of 3 to 15 Pa, determined by rotational rheometer at a consistency of 0.5 wt % (aqueous medium).

The invention claimed is:

1. A method for catalytic oxidation of cellulose in fibrous cellulosic material, especially fibers obtained from plant material, using a heterocyclic nitroxyl radical as catalyst and main oxidant acting as oxygen source, characterized in that the method comprises, before the catalytic oxidation of the cellulose, pretreatment of the cellulose
   in an alkaline pretreatment step, where the fibrous cellulosic material is treated in alkaline solution having hydroxide concentration of 0.3-2.4 M, and
   in a washing step, where the fibrous cellulosic material treated in the alkaline solution is washed to lower the pH.

2. The method according to claim 1, characterized in that the treatment time of cellulose in the alkaline solution is 30 s-60 min.

3. The method according to claim 1, characterized in that the alkaline solution is alkali metal hydroxide solution.

4. The method according to claim 1, characterized in that in the washing step, the pH is lowered to alkaline range.

5. The method according to claim 4, characterized in that the pH is lowered to the range of 8-12.

6. The method according to claim 4, characterized in that the pH is lowered to the range of 9-11.

7. The method according to claim 4, characterized in that the pH is lowered to the range of 9-10.

8. The method according to claim 1, characterized in that in the pretreatment, the crystalline regions of cellulose remain as cellulose I.

9. The method according to claim 1, characterized in that in the pretreatment, the DP of the cellulose decreases at the most by 20% compared with the original value.

10. The method according to claim 1, characterized in that the fibrous cellulosic material comprises hemicellulose, and the hemicellulose content is reduced in the pretreatment.

11. The method according to claim 1, characterized in that the alkaline solution used in the preteatment is circulated, and if necessary, hemicellulose is removed from the alkaline solution.

12. The method according to claim 1, characterized in that the reaction time in the catalytic oxidation of the pretreated cellulose is below 1 hour.

13. The method according to claim 1, characterized in that it comprises a preliminary activation step of the heterocyclic nitroxyl catalyst in the absence of cellulose before the catalytic oxidation of the pretreated cellulose.

14. The method according to claim 1, characterized in that hypochlorite is used as the main oxidant in the catalytic oxidation of the pretreated cellulose.

15. The method according to claim 1, characterized in that in the catalytic oxidation of the pretreated cellulose, the pH is 7-10.

16. The method according to claim 1, characterized in that the pulp initial consistency in the catalytic oxidation of the pretreated cellulose is above 6%.

17. The method according to claim 1, characterized in that the pretreated cellulose is oxidized in the absence of bromide or iodide.

18. The method according to claim 1, characterized in that after the catalytic oxidation of the pretreated cellulose, aldehyde groups in the cellulose are oxidized to carboxylic groups in a second, complementary oxidation step.

19. The method according to claim 1, characterized in that the pretreated cellulose is oxidized to the level of 0.5-1.6 mmol COOH/g pulp.

20. The method according to claim 1, characterized in that after the catalytic oxidation, the oxidized fibrous raw material is disintegrated.

21. The method according to claim 20, characterized in that the oxidized fibrous raw material is disintegrated to nanofibrillar cellulose (NFC) having shear-thinning behavior, with zero shear viscosity in the range of 1,000 to 100,000 Pa·s, and with a yield stress in the range of 1 to 50 Pa, determined by rotational rheometer at a consistency of 0.5 wt % in aqueous medium.

22. The method according to claim 21, characterized in that the nanofibrillar cellulose is essentially crystalline with degree of crystallinity of at least 55%, being preferably made of plant material.

23. The method according to claim 20, characterized in that the oxidized fibrous raw material is disintegrated to nanofibrillar cellulose (NFC) having shear-thinning behavior, with zero shear viscosity in the range of 5,000 to 50,000 and with a yield stress in the range of 3 to 15 Pa, determined by rotational rheometer at a consistency of 0.5 wt % in aqueous medium.

24. The method of claim 1, where the fibrous cellulosic material is treated in alkaline solution having hydroxide concentration of 0.5-1.5 M.

25. The method of claim 1, where the fibrous cellulosic material is treated in alkaline solution having hydroxide concentration of 0.6-1.2 M.

26. The method according to claim 1, characterized in that the treatment time of cellulose in the alkaline solution is 1-15 min.

27. The method according to claim 1, characterized in that the alkaline solution is sodium hydroxide (NaOH) solution.

28. The method according to claim 1, characterized in that in the washing step, the pH is lowered to at the most 12.

29. The method according to claim 1, characterized in that in the washing step, the pH is lowered to below 12.

30. The method according to claim 1, characterized in that in the pretreatment, the DP of the cellulose decreases at the most by 10% compared with the original value.

31. The method according to claim 1, characterized in that in the pretreatment, the DP of the cellulose remains the same compared with the original value.

32. The method according to claim 1, characterized in that in the catalytic oxidation of the pretreated cellulose, the pH is 8-9.5.

33. The method according to claim 1, characterized in that the pulp initial consistency in the catalytic oxidation of the pretreated cellulose is above 6% and at the most 12%.

34. The method according to claim 1, characterized in that the pulp initial consistency in the catalytic oxidation of the pretreated cellulose is in the range of 8-12%.

35. The method according to claim 1, characterized in that the pretreated cellulose is oxidized to the level of 0.5-1.1 mmol COOH/g pulp.

36. The method according to claim 1, characterized in that the pretreated cellulose is oxidized to the level of 0.6-0.95 mmol COOH/g pulp.

* * * * *